United States Patent
Frank et al.

(10) Patent No.: US 8,010,287 B1
(45) Date of Patent: Aug. 30, 2011

(54) FREQUENCY HOPPING DATA LINK APPROACH TO AUTONOMOUS GPS DENIED RELATIVE NAVIGATION DETERMINATION

(75) Inventors: Robert J. Frank, Cedar Rapids, IA (US); Scott J. Zogg, Cedar Rapids, IA (US); Gary A. McGraw, Cedar Rapids, IA (US); Dana J. Jensen, Marion, IA (US); Bernard A. Schnaufer, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1050 days.

(21) Appl. No.: 11/891,922

(22) Filed: Aug. 14, 2007

(51) Int. Cl.
*G01S 1/24* (2006.01)
*B64D 39/00* (2006.01)
*G06F 19/00* (2006.01)

(52) U.S. Cl. ........ 701/213; 701/21; 701/300; 244/135 A
(58) Field of Classification Search .................. 701/200, 701/213, 300, 226, 209, 21; 244/181, 135 A
See application file for complete search history.

(56) References Cited

U.S. PATENT DOCUMENTS

| | | | | |
|---|---|---|---|---|
| 4,527,161 A * | 7/1985 | Wehner | ......... | 342/152 |
| 6,018,659 A * | 1/2000 | Ayyagari et al. | ........ | 455/431 |
| 6,072,433 A * | 6/2000 | Young et al. | ......... | 342/386 |
| 7,149,648 B1 * | 12/2006 | Hreha | ......... | 702/152 |
| 7,702,460 B2 * | 4/2010 | Liu et al. | ......... | 701/214 |
| 2002/0147544 A1 * | 10/2002 | Nicosia et al. | ........ | 701/207 |

* cited by examiner

*Primary Examiner* — Tan Q Nguyen
(74) *Attorney, Agent, or Firm* — Daniel M. Barbieri

(57) ABSTRACT

The present invention is directed to accurate GPS (global positioning system)-free relative navigation between an unmanned aerial vehicle (UAV) and a tanker aircraft. The UAV transmits a signal which is received by an antenna array at the tanker aircraft. Horizontal relative position of the UAV is determined by calculating range and bearing based on time and phase differences in the received signal. Vertical relative position of the UAV is determined by comparing the altitude of the UAV with the altitude of the tanker aircraft. The tanker aircraft then transmits a navigation solution based on the relative position of the UAV which is received by the UAV. The UAV may utilize the navigation solution transmitted by the tanker aircraft as a backup to a GPS determined navigation solution, in a GPS denied scenario, or in combination with an INS (inertial navigation system) determined navigation solution.

18 Claims, 5 Drawing Sheets

FREQUENCY HOPPING DATA LINK APPROACH TO AUTONOMOUS GPS DENIED RELATIVE NAVIGATION DETERMINATION

FIELD OF THE INVENTION

The present invention relates generally to relative navigation determination and more particularly to a frequency hopping data link approach to autonomous GPS (global positioning system) denied relative navigation determination.

BACKGROUND OF THE INVENTION

Aerial refueling is a process of transferring fuel from a tanker aircraft to a receiving aircraft during flight. Aerial refueling allows a receiving aircraft to remain airborne longer and extend its range. Referring to FIG. 1, autonomous Aerial Refueling (AAR) 100 is a process whereby Unmanned Aerial Vehicles (UAV) 102 receive fuel from a tanker aircraft 101 during unmanned flight. AAR 100 allows an UAV 102 to remain airborne longer and extend its range. AAR 100 requires precise position determination for the tanker aircraft 101 and UAV 102 in order for the UAV 102 to travel to contact with the tanker aircraft 101 and receive fuel.

Typically, position determination for AAR 100 is provided by GPS (global positioning system). However, GPS may not be available for position determination (such as when GPS is jammed or is blocked). INS (inertial navigation system) could be utilized to determine position in a GPS-denied scenario, but excessive position error accumulation after several minutes of operation without GPS updates makes INS insufficient as a sole method of determining position for AAR 100.

Consequently, it would be desirable to provide autonomous GPS denied relative navigation which addresses the above-referenced problems and limitations of the current solutions.

SUMMARY OF THE INVENTION

Accordingly, the present invention is directed to accurate GPS (global positioning system)-free relative navigation between an unmanned aerial vehicle (UAV) and a tanker aircraft by determining ranging and bearing utilizing a frequency hopping communication system datalink in combination with an antenna array comprising at least three antenna elements. The frequency hopping communication system may comprise TTNT (Tactical Targeting Network Technology).

The UAV transmits a signal utilizing a frequency hopping communication system transmitter. The signal transmitted includes two short know frequency dwells. The signal is received by the antenna array at the tanker aircraft which includes a set of two longitudinal antennas and two lateral antennas (an antenna may simultaneously belong to more than one set). The set of two longitudinal antennas receive the first frequency dwell and the set of two lateral antennas then receive the second frequency dwell. A processing unit calculates the range between the UAV and the tanker aircraft based on the time difference between a timestamp included in the signal and the time the antenna array received the signal. The processing unit calculates a longitudinal phase difference based on the difference between the first frequency dwell received by the two longitudinal antennas and a lateral phase difference based on the difference between the second frequency dwell received by the two lateral antennas. The processing unit calculates the bearing between the UAV and the tanker aircraft based on the longitudinal and lateral phase differences. The processing unit calculates the horizontal relative position of the UAV based on the range and bearing between the UAV and the tanker aircraft. The processing unit calculates the vertical relative position of the UAV by comparing the altitude of the UAV included in the signal with the altitude of the tanker aircraft. The processing unit calculates a navigation solution between the UAV and the tanker aircraft based on the horizontal relative position and the vertical relative position of the UAV. A frequency hopping communication system transmitter at the tanker aircraft then transmits the navigation solution which is received by a frequency hopping communication system receiver at the UAV.

The UAV may utilize the navigation solution transmitted by the tanker aircraft as a backup to a GPS determined navigation solution or in a GPS denied scenario. The UAV may combine the navigation solution transmitted by the tanker aircraft with an INS (inertial navigation system) determined navigation solution to reduce the rate at which the frequency hopping communication system transmitter of the UAV is required to transmit.

The accuracy of the navigation solution provided by the present invention allows for operations through the pre-contact transition point, which is about a 1 nmi (nautical mile) tanker/UAV separation. This could be utilized for initializing the EO (electro-optical) system capture from the transition point all the way to the contact and fueling stages. Alternatively, the navigation solution could be utilized beyond the pre-contact transition point, such as during capture and refueling. Utilizing a frequency hopping communication system for ranging and bearing determination is advantageous compared to legacy systems such as TACAN (Tactical Air Navigation) due to the anti-jam (AJ) robustness and low detectability of the waveform.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to exemplary embodiments of the invention, examples of which are illustrated in the accompanying drawings.

Figure 1:
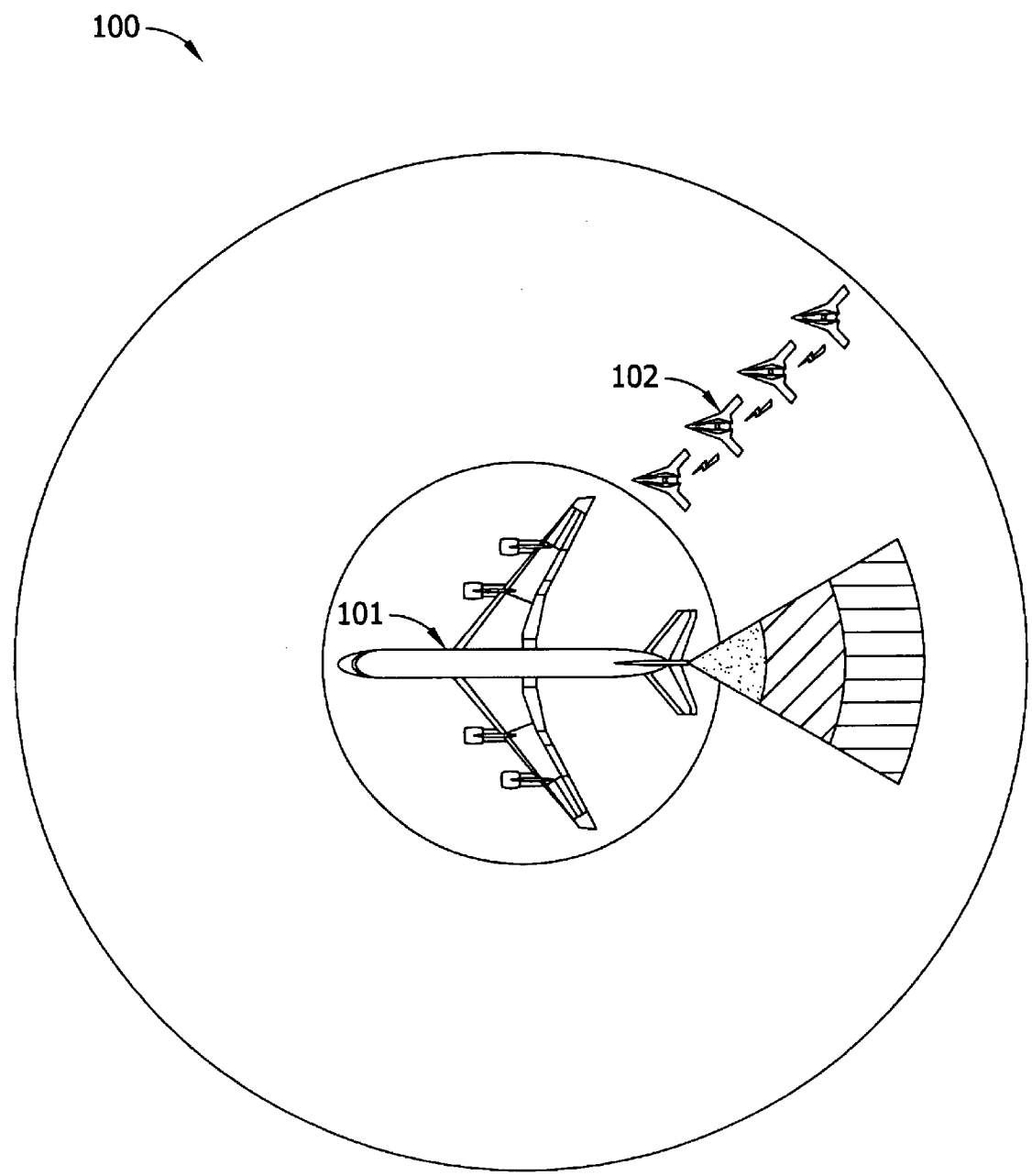
FIG. 1 is an aerial view diagram illustrating Autonomous Aerial Refueling (AAR)
Figure 2:
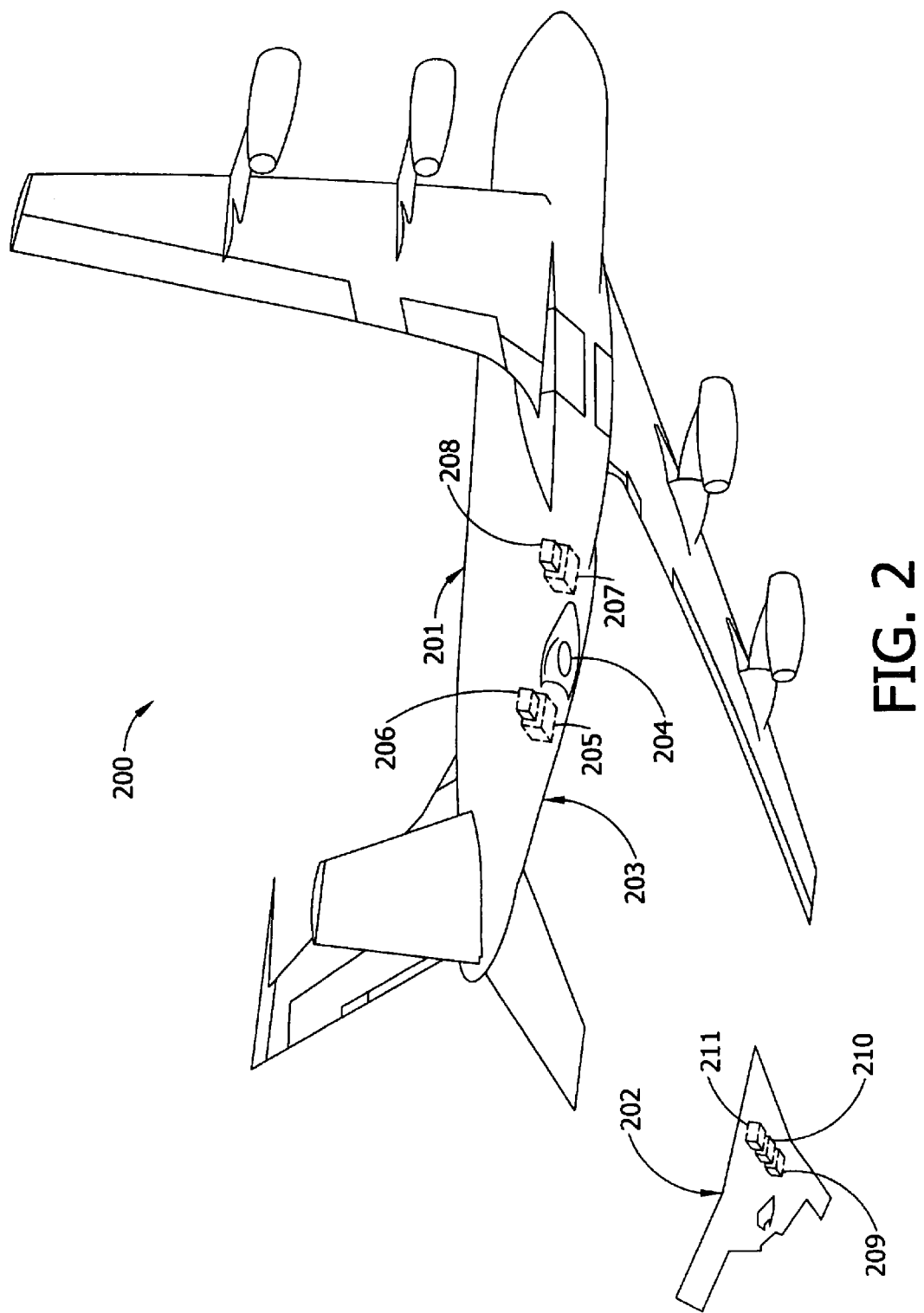
FIG. 2 is a diagram illustrating a system for providing relative navigation for AAR, in accordance with an exemplary embodiment of the present invention.

Accurate GPS (global positioning system)-free relative positioning can be provided via a frequency hopping communication system datalink using ranging in combination with bearing utilizing an antenna array comprising at least three antenna elements. Referring generally to FIG. 2; a system 200 for providing relative navigation for Autonomous Aerial Refueling (AAR), in accordance with an exemplary embodiment of the present invention, is illustrated. The system 200 comprises a first vehicle, such as tanker aircraft 201, and a second vehicle, such as Unmanned Aerial Vehicle (UAV) 202.

The tanker aircraft 201 includes an antenna array 204 comprising at least three elements, a processing unit 205, and a frequency hopping communication system transmitter 206. The antenna array 204 may comprise numbers of antenna elements other than three, including, but not limited to, four, five or six. The frequency hopping communication system may comprise TTNT (Tactical Targeting Network Technology). TTNT is an Internet Protocol (IP) based, high-speed, dynamic ad hoc network designed to enable the U.S. military to quickly target moving and time-critical targets. The tanker aircraft 201 may also include an antenna interface unit (AIU) 207 and an altimeter 208. The altimeter may comprise a barometric altimeter. The AIU 207 may operatively couple the antenna array 204 to the processing unit 205.

The UAV 202 includes a frequency hopping communication system transmitter 209 and a frequency hopping communication system receiver 210. The frequency hopping communication system may comprise TTNT (Tactical Targeting Network Technology). The UAV 202 may also include an altimeter 211. The altimeter 211 may comprise a barometric altimeter.

The frequency hopping communication system transmitter 209 of the UAV 202 transmits a signal. The signal may include a precise timestamp of the time of transmission. The signal may also include the altitude of the UAV 202. The signal is received by the antenna array 204. The processing unit 205 calculates the relative position of the UAV 202 based on time and phase differences in the signal received by the elements of the antenna array 204. The processing unit 205 calculates the range between the UAV 202 and the tanker aircraft 201 based on the time difference between the timestamp included in the signal and the time the antenna array 204 received the signal. The processing unit 205 calculates phase differences between the signal received by the different elements of the antenna array 204 and calculates the bearing between the UAV 202 and the tanker aircraft 201 based on the phase differences. The processing unit 205 calculates the horizontal relative position of the UAV 202 based on the range and bearing between the UAV 202 and the tanker aircraft 201. The processing unit 205 calculates the vertical relative position of the UAV 202 by comparing the altitude of the UAV 202 included in the signal with the altitude of the tanker aircraft 201. The processing unit 205 calculates a navigation solution between the UAV 202 and the tanker aircraft 201 based on the horizontal relative position and the vertical relative position of the UAV 202. The frequency hopping communication system transmitter 206 of the tanker aircraft 201 then transmits the navigation solution which is received by the frequency hopping communication system receiver 210 of the UAV 202.

Figure 3:
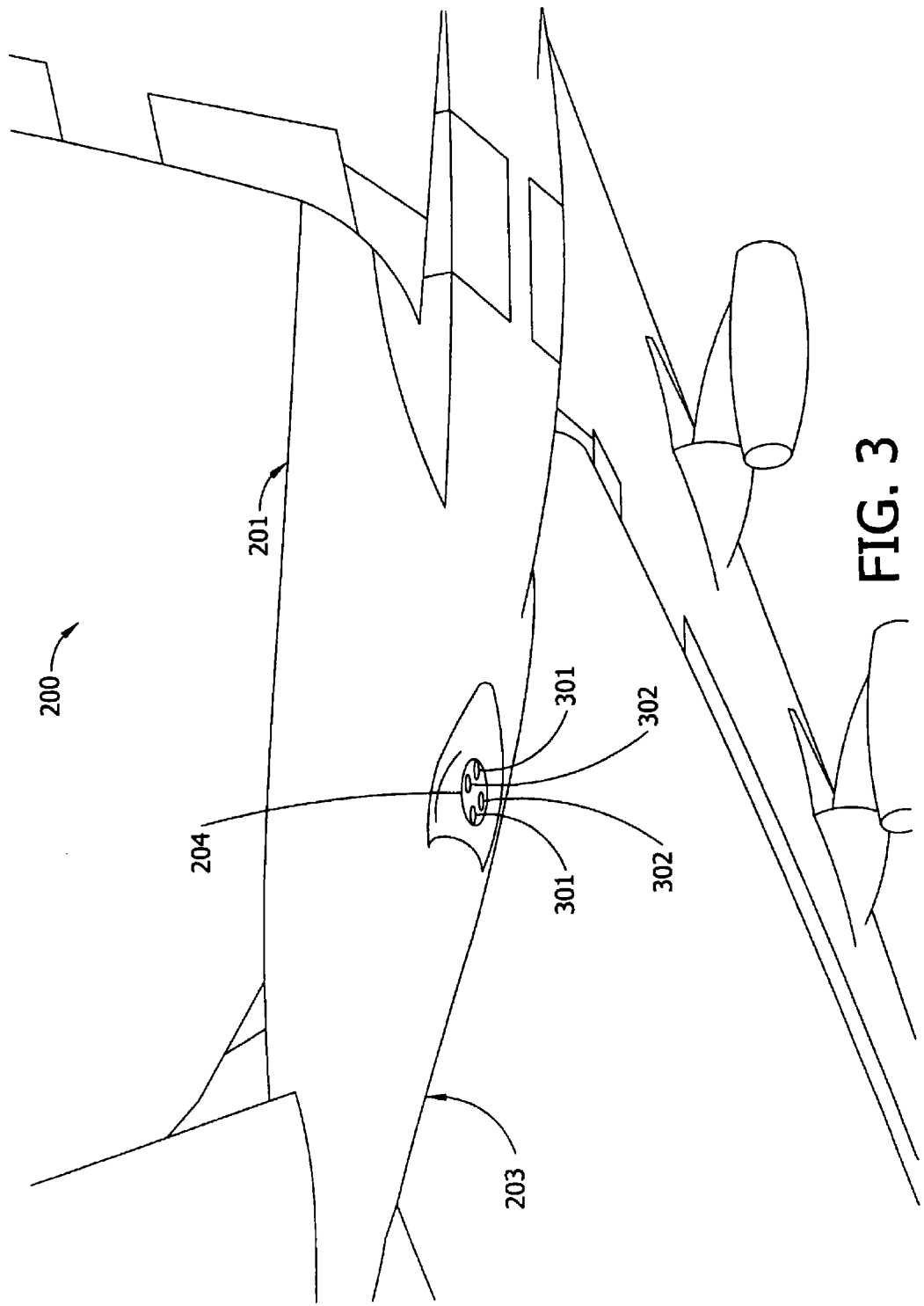
FIG. 3 is a detail view of a tanker aircraft with a four element antenna array, in accordance with an exemplary embodiment of the present invention.

Referring now to FIG. 3; a detail view of the antenna array 204, in accordance with an exemplary embodiment of the present invention is shown. The antenna array 204 is shown comprising four antenna elements. It is to be understood that the antenna array 204 may comprise other numbers of antenna elements (including, but not limited to, 3 or 5) without departing from the scope of the present invention. The antenna array 204 may be flush mounted on the underside 203 of the tanker aircraft 201 and may provide three-hundred and sixty degree azimuth coverage. The antenna array 204 may include a set of two longitudinal antennas 301 and a set of two lateral antennas 302 (an antenna may simultaneously belong to more than one set). The signal transmitted by the frequency hopping communication system transmitter 209 of the UAV 202 may include two short know frequency dwells. The set of two longitudinal antennas 301 may receive the first frequency dwell. The set of two lateral antennas 302 may then receive the second frequency dwell. The processing unit 205 may calculate a longitudinal phase difference based on the difference between the first frequency dwell received by the two longitudinal antennas 301. The processing unit 205 may calculate a lateral phase difference based on the difference between the second frequency dwell received by the two lateral antennas 302. The longitudinal phase difference and the lateral phase difference may comprise the phase differences the processing unit 205 utilizes to calculate the bearing between the UAV 202 and the tanker aircraft 201.

Figure 4:
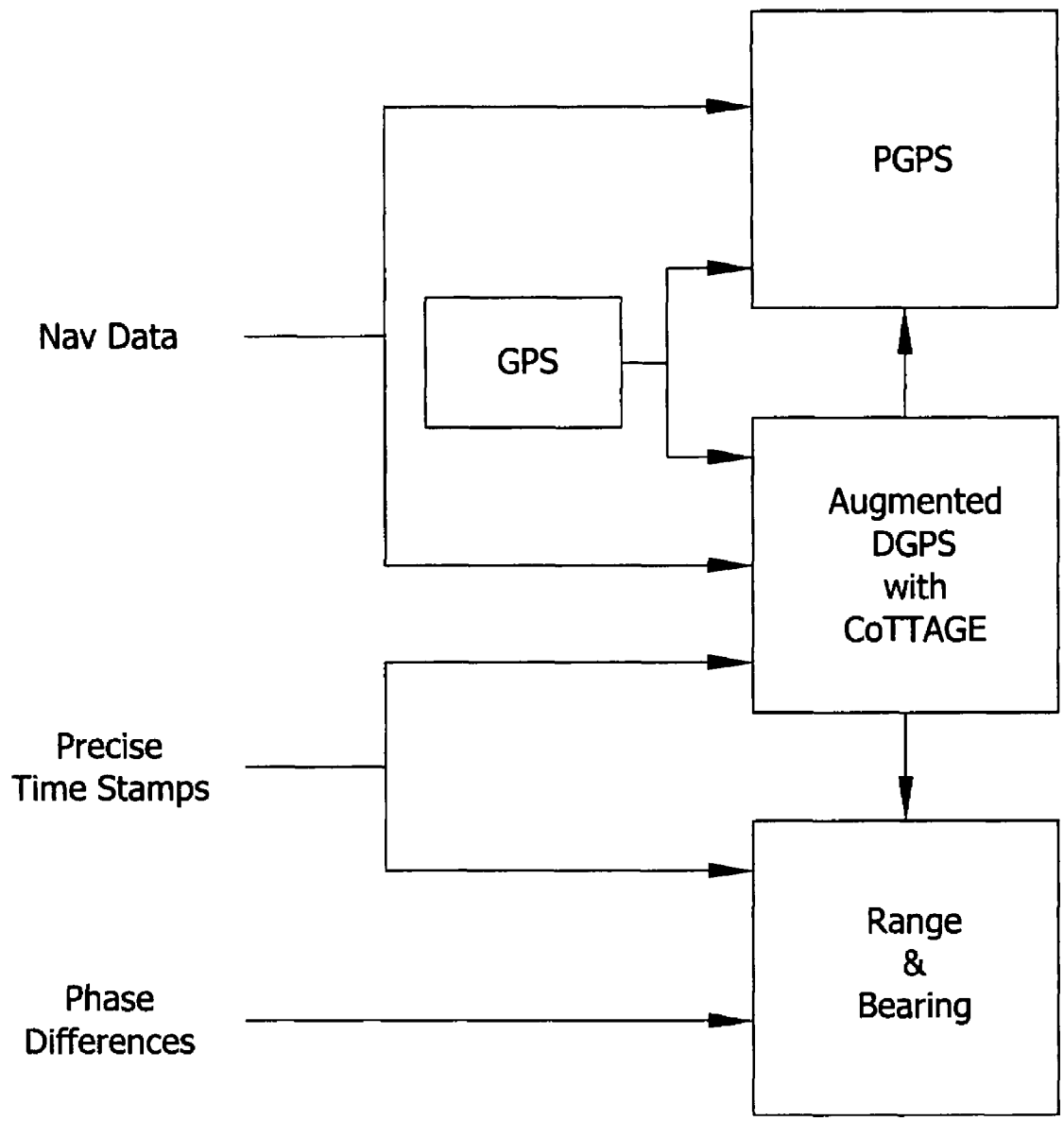
FIG. 4 is a block diagram illustrating the relationship among different AAR navigation functionality.

The UAV 202 may utilize the navigation solution transmitted by the tanker aircraft 201 as a backup to a GPS determined navigation solution or in a GPS denied scenario. The UAV 202 may combine the navigation solution transmitted by the tanker aircraft 201 with an INS (inertial navigation system) determined navigation solution to reduce the rate at which the frequency hopping communication system transmitter 209 of the UAV 202 is required to transmit. FIG. 4 illustrates how measurements (transmitted navigational data, timestamps, and phase differences) based on the signal received by the antenna array 204 support different AAR navigational functionality.

Figure 5:
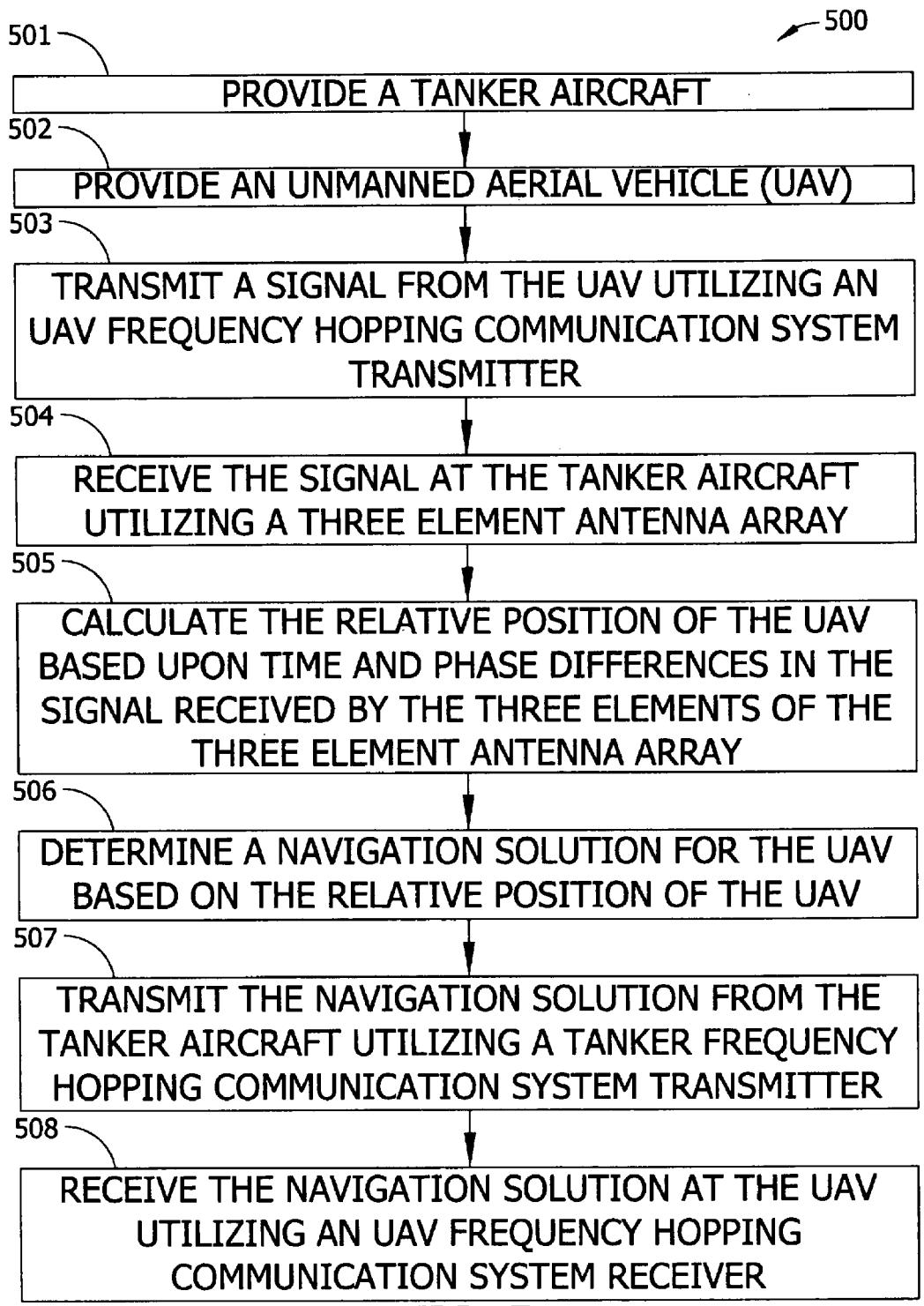
FIG. 5 is a flow chart illustrating a method of providing relative navigation for AAR, in accordance with an exemplary embodiment of the present invention.

Referring now to FIG. 5, a method 500 providing relative navigation for AAR, in accordance with an exemplary embodiment of the present invention, is shown. In step 501, a first vehicle, such as a tanker aircraft, is provided. In step 502, a second vehicle, such as an UAV, is provided. In step 503, a signal is transmitted from the UAV utilizing an UAV frequency hopping communication system transmitter. In step 504, the signal is received at the tanker aircraft utilizing an antenna array comprising at least three antenna elements. In step 505, a relative position of the UAV is calculated based on time and phase differences in the signal received by the antenna elements of the antenna array. In step 506, a navigation solution for the UAV is determined based on the relative position of the UAV. In step 507, the navigation solution is transmitted from the tanker aircraft utilizing a frequency hopping communication system transmitter. In step 508, the navigation solution is received at the UAV utilizing an UAV frequency hopping communication system receiver.

The accuracy of the navigation solution provided by the present invention allows for operations through the pre-contact transition point, which is about a 1 nmi (nautical mile) tanker/UAV separation. This could be utilized for initializing the EO (electro-optical) system capture from the transition point all the way to the contact and fueling stages. Alternatively, the navigation solution could be utilized beyond the pre-contact transition point, such as during capture and refueling. Utilizing a frequency hopping communication system for ranging and bearing determination is advantageous compared to legacy systems such as TACAN (Tactical Air Navigation) due to the anti-jam (AJ) robustness and low detectability of the waveform.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of providing a relative navigation solution between a first vehicle and a second vehicle, the method comprising the steps of:
   receiving a first signal, as transmitted by a second vehicle transceiver, at the first vehicle utilizing a first vehicle antenna array including at least three spatially separated antenna elements operably connected to a first vehicle transceiver;
   calculating a relative position of the second vehicle based upon time, altitude, and phase differences included in the first signal received by the first vehicle transceiver;
   determining a relative navigation solution for the second vehicle based on the relative position of the second vehicle;
   transmitting a second signal from the first vehicle transceiver, the signal including the relative navigation solution for the second vehicle;
   wherein the first vehicle transceiver is configured to transmit and receive via synchronized frequency hopping communication, the first vehicle transceiver frequency being time synchronized with the second vehicle transceiver frequency.

2. The method of claim 1, wherein the first signal includes the altitude of the second vehicle and the step of calculating the relative position of the second vehicle includes the steps of:
   determining the altitude of the first vehicle;
   calculating a vertical component of the relative position of the second vehicle based on the difference between the altitude of the first vehicle and the altitude of the second vehicle.

3. The method of claim 2, wherein the altitude of the first vehicle is barometric altitude and the altitude of the second vehicle is barometric altitude.

4. The method of claim 1, wherein the antenna array is coupled to an antenna interface unit and the antenna array comprises a set of two longitudinal antennas and a set of two lateral antennas.

5. The method of claim 4, wherein the first signal comprises a first frequency dwell and a second frequency dwell and the step of calculating the relative position of the second vehicle comprises the steps of:
   calculating a range based on the difference between a transmission timestamp of the first signal and a reception timestamp of the first signal;
   determining the first frequency dwell based on the first signal received by the longitudinal antennas;
   determining the second frequency dwell based on the first signal received by the lateral antennas;
   calculating a longitudinal phase difference based on the first frequency dwell;
   calculating a lateral phase difference based on the second frequency dwell; and
   calculating a bearing of the second vehicle based on the longitudinal phase difference and the lateral phase difference.

6. The method of claim 1, wherein the synchronized frequency hopping communication comprises tactical targeting network technology (TINT).

7. The method of claim 1, wherein the second vehicle utilizes the navigation solution as a backup to a global positioning system (GPS) determined navigation solution.

8. The method of claim 1, wherein the second vehicle combines the navigation solution with an inertial navigation system (INS) determined navigation solution.

9. The method of claim 1, wherein the antenna array is flush mounted on the underside of the first vehicle.

10. The method of claim 1, wherein the antenna array provides three-hundred and sixty degree azimuth coverage.

11. A system for providing a relative navigation solution between a first vehicle and a second vehicle, comprising:
   a transceiver operably mounted on a first vehicle, the transceiver including:
      an antenna array comprising at least three spatially separated antenna elements;
      a processing unit operably coupled to the antenna array; and
   wherein the first vehicle transceiver receives a first signal as transmitted by a second vehicle transceiver, the processing unit calculates the relative position of the second vehicle based upon time, altitude, and phase differences included in the first signal the processing unit determines the relative navigation solution based on the relative position of the second vehicle, and the first vehicle transceiver transmits a second signal including the navigation solution to the second vehicle transceiver, the first vehicle transceiver being configured to transmit and receive via synchronized frequency hopping communication, and the first vehicle transceiver frequency is time synchronized with the second vehicle transceiver frequency.

12. The system of claim 11, wherein providing a relative navigation solution further includes a first vehicle altimeter operably coupled to the processing unit, the first signal, as transmitted by the second vehicle transceiver and received by the first vehicle transceiver, includes an altitude of the second vehicle, the processing unit calculates a vertical component of the relative position of the second vehicle based on the difference between the altitude of the first vehicle and the altitude of the second vehicle.

13. The system of claim 12, wherein the first vehicle altimeter is a barometric altimeter and the altitude of the second vehicle included in the first signal is barometric.

14. The system of claim 11, wherein the processing unit is operably coupled to the antenna array via an antenna interface unit and the antenna array comprises a set of two longitudinal antennas and a set of two lateral antennas.

15. The system of claim 14, wherein the first signal comprises a first frequency dwell and a second frequency dwell, the processing unit calculates a bearing of the second vehicle based on a longitudinal phase difference and a lateral phase difference, the processing unit calculates the longitudinal phase difference based on the first frequency dwell, the processing unit calculates the lateral phase difference based on the second frequency dwell, the processing unit determines the first frequency dwell based on the first signal received by the longitudinal antennas, the processing unit determines the second frequency dwell based on the first signal received by the lateral antennas, the first signal includes a transmission timestamp and a reception timestamp, and the processing unit calculates a range based on the difference between the transmission timestamp and the reception timestamp.

16. The system of claim 11, wherein the synchronized frequency hopping communication comprises tactical targeting network technology (TINT).

17. The system of claim 11, wherein the antenna array is flush mounted on the underside of the first vehicle.

18. The system of claim 11, wherein the antenna array provides three-hundred and sixty degree azimuth coverage.

* * * * *